United States Patent
Waki

(10) Patent No.: US 8,514,415 B2
(45) Date of Patent: Aug. 20, 2013

(54) METHOD AND PROGRAM TO BE IMPLEMENTED BY PRINT SETTING DEVICE WHICH SETS PRINT SETTING ITEM

(75) Inventor: Shogo Waki, Kawasaki (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 413 days.

(21) Appl. No.: 12/626,230

(22) Filed: Nov. 25, 2009

(65) Prior Publication Data
US 2010/0157346 A1 Jun. 24, 2010

(30) Foreign Application Priority Data
Dec. 1, 2008 (JP) ................................ 2008-306359

(51) Int. Cl.
*G06F 3/12* (2006.01)

(52) U.S. Cl.
USPC .............. 358/1.13; 358/1.12; 347/5; 709/226

(58) Field of Classification Search
USPC ........................... 358/1.13, 1.14, 1.15; 347/5
See application file for complete search history.

(56) References Cited

U.S. PATENT DOCUMENTS

| | | | | |
|---|---|---|---|---|
| 5,371,837 A | * | 12/1994 | Kimber et al. | 358/1.15 |
| 5,881,213 A | * | 3/1999 | Shaw et al. | 358/1.15 |
| 5,960,168 A | * | 9/1999 | Shaw et al. | 358/1.15 |
| 6,883,981 B2 | * | 4/2005 | Kizaki et al. | 400/76 |
| 6,967,728 B1 | * | 11/2005 | Vidyanand | 358/1.12 |
| 7,307,742 B2 | * | 12/2007 | Noda | 358/1.13 |
| 8,270,007 B2 | * | 9/2012 | Pandit et al. | 358/1.15 |
| 8,294,925 B2 | * | 10/2012 | Vidyanand | 358/1.15 |
| 2002/0120742 A1 | * | 8/2002 | Cherry | 709/226 |
| 2003/0063305 A1 | * | 4/2003 | McIntyre | 358/1.13 |
| 2003/0081019 A1 | * | 5/2003 | Frolik et al. | 347/5 |
| 2003/0202010 A1 | * | 10/2003 | Kerby et al. | 345/744 |
| 2005/0046875 A1 | * | 3/2005 | Gibson | 358/1.1 |
| 2005/0289248 A1 | * | 12/2005 | Payne | 710/8 |
| 2006/0023246 A1 | * | 2/2006 | Vidyanand | 358/1.13 |
| 2008/0180741 A1 | * | 7/2008 | Miyata | 358/1.15 |
| 2008/0297838 A1 | * | 12/2008 | Matsui et al. | 358/1.15 |
| 2009/0086268 A1 | * | 4/2009 | Iwashita | 358/1.15 |
| 2009/0106542 A1 | * | 4/2009 | Dubs et al. | 713/1 |
| 2010/0118330 A1 | * | 5/2010 | Feijoo et al. | 358/1.15 |

FOREIGN PATENT DOCUMENTS

| | | |
|---|---|---|
| JP | 2002-351631 | 12/2002 |
| JP | 2003-6066 A | 1/2003 |
| JP | 2004-126940 | 4/2004 |

(Continued)

OTHER PUBLICATIONS

Notice of Allowance dated Apr. 12, 2011, which issued in Japanese Patent Application No. 2008-306359, along with English Translation (6 pages).

(Continued)

*Primary Examiner* — King Poon
*Assistant Examiner* — Ted Barnes
(74) *Attorney, Agent, or Firm* — Finnegan, Henderson, Farabow, Garrett & Dunner, L.L.P.

(57) ABSTRACT

When the printer selected by a user is judged to be one that has been searched out with using functional conditions, a PC as a print setting device reflects the functional conditions used as the search condition in the initial values of the print setting items for that printer.

18 Claims, 15 Drawing Sheets

(56) References Cited

FOREIGN PATENT DOCUMENTS

| JP | 2005-228243 | 8/2005 |
| JP | 2006-268586 A | 10/2006 |
| JP | 2006-293771 A | 10/2006 |
| JP | 2007-094554 | 4/2007 |
| JP | 2007-133611 | 5/2007 |
| JP | 2008-3784 A | 1/2008 |
| JP | 2008-217097 A | 9/2008 |

OTHER PUBLICATIONS

Office Action dated Aug. 31, 2010 for Japanese Application No. 2008-306359.

* cited by examiner

FIG. 12

| MODEL A | MODEL B | MODEL C |
|---------|---------|---------|
| DUPLEX  | DUPLEX  | DUPLEX  |
| STAPLE  | STAPLE  | ------  |
| PUNCH   | ------  | ------  |

FIG. 13

(1) CHANGE OVER FROM PRINTER P1 (MODEL A) TO PRINTER P2 (MODEL A)

PRINTER P1 (MODEL A)

| DUPLEX | OFF |
|---|---|
| STAPLE | OFF |
| PUNCH | OFF |

↓ CHANGE SETTING VALUES     M1

| DUPLEX | ON |
|---|---|
| STAPLE | ON |
| PUNCH | ON |

STORE →

| DUPLEX | ON |
|---|---|
| STAPLE | ON |
| PUNCH | ON |

↓ CHANGE OVER PRINTER

PRINTER P2 (MODEL A)

| DUPLEX | ON |
|---|---|
| STAPLE | ON |
| PUNCH | ON |

← REFLECT (2) CHANGE OVER FROM PRINTER P1 (MODEL A) TO PRINTER P2 (MODEL B)

PRINTER P1 (MODEL A)

| DUPLEX | OFF |
|---|---|
| STAPLE | OFF |
| PUNCH | OFF |

↓ CHANGE SETTING VALUES     M1

| DUPLEX | ON |
|---|---|
| STAPLE | ON |
| PUNCH | ON |

STORE →

| DUPLEX | ON |
|---|---|
| STAPLE | ON |
| PUNCH | ON |

↓ CHANGE OVER PRINTER

PRINTER P2 (MODEL B)

| DUPLEX | ON |
|---|---|
| STAPLE | ON |
| ----- | |

← REFLECT (3) CHANGE OVER FROM PRINTER P1 (MODEL C) TO PRINTER P2 (MODEL A)

PRINTER P1 (MODEL C)

| DUPLEX | OFF |
|---|---|
| ----- | |
| ----- | |

↓ CHANGE SETTING VALUES     M1

| DUPLEX | ON |
|---|---|
| ----- | |
| ----- | |

STORE →

| DUPLEX | ON |
|---|---|
| ----- | |
| ----- | |

↓ CHANGE OVER PRINTER

PRINTER P2 (MODEL A)

| DUPLEX | ON |
|---|---|
| STAPLE | OFF |
| PUNCH | OFF |

← REFLECT

FIG. 16
(1) CHANGE OVER FROM PRINTER P1 (MODEL B) TO PRINTER P2 (MODEL B)
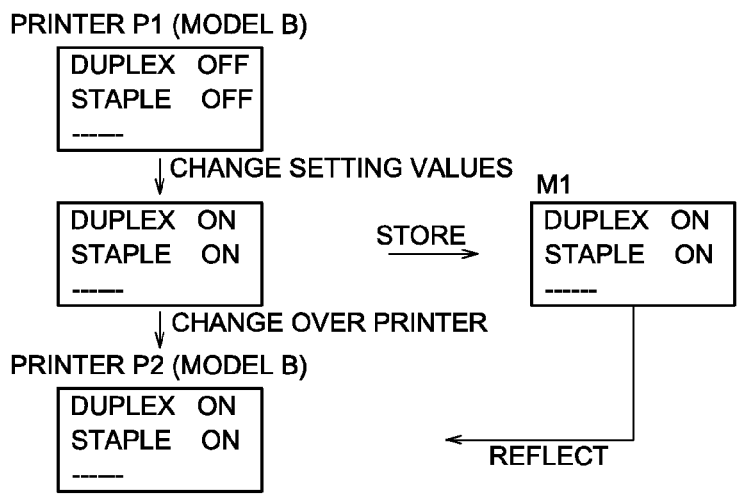
(2) CHANGE OVER FROM PRINTER P1 (MODEL B) TO PRINTER P2 (MODEL A)
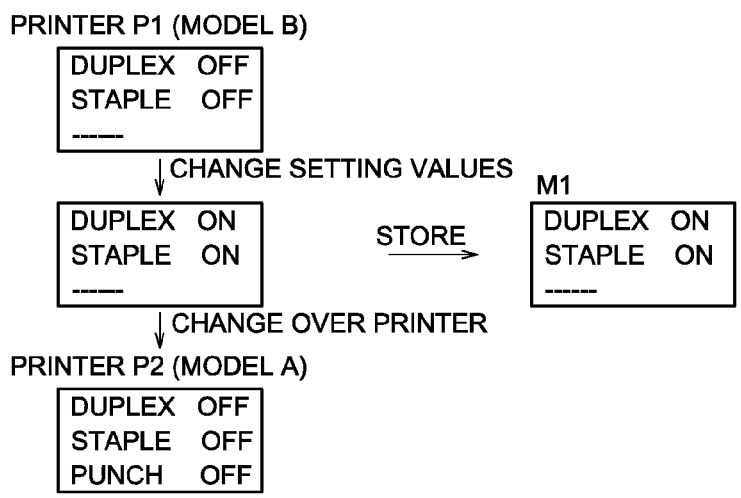

METHOD AND PROGRAM TO BE IMPLEMENTED BY PRINT SETTING DEVICE WHICH SETS PRINT SETTING ITEM

This application is based on Japanese Patent Application No. 2008-306359 filed on Dec. 1, 2008 with Japanese Patent Office, the entire content of which is hereby incorporated by reference.

BACKGROUND OF THE INVENTION

The present invention relates to a method and a program which are implemented by a print setting device for setting a print setting item that specifies print conditions in a printing device selected by a user from a plurality of printing devices.

A user can set print setting items that specify various types of print conditions such as a sheet size and duplex printing to desired values and send to a printer a print job whose print conditions are designated, by using a control program that is called a printer driver on PC (personal computer).

In recent years, there have been suggested printer drivers (the so-called universal printer drivers) each being common to plural models wherein one printer driver can cope with printers of plural models (printer types), and a printer representing the destination for output can be changed over for selection for every practice of printing (see Unexamined Japanese Patent Application Publication No. 2007-133611 and Unexamined Japanese Patent Application Publication No. 2002-351631). In these printer drivers, it is possible to search out printers after determining functional conditions of the printer including, for example, capability for duplex printing, capability for stapling and capability for punching.

However, in the technologies described in the aforesaid patent documents, there has been a fact that default values are left on the print setting items in a print setting screen without considering the search conditions even a printer was selected from the list of searched printers.

For example, when printers have been searched out under the condition of capability for duplex printing, even when the print setting screen is opened after selecting a printer that is listed up, a setting value of the item of "printing type", for example, remains unchanged to be "single-sided" which is the default value. In this case, for practicing the desired printing, a user has been forced to do operations to flip open print setting screen and change the print setting items on the print setting screen from the default value to a desired value, which are troublesome and are apt to be forgotten.

The present invention has been accomplished in view of the aforesaid problems, and its objective is to provide a method and a program which are implemented by a print setting device for setting print setting items, which makes it possible to carry out printing that is desired by a user, without doing unnecessary procedures.

SUMMARY

To achieve at least one of the abovementioned objects, a method carried out in a print setting device that reflects one aspect of the present invention comprises:

1. A method to be implemented by a print setting device for setting a print setting item which specifies a print condition in a printing device selected by a user from a plurality of printing devices with the method including steps of judging whether or not the printing device selected by the user is one of printers that have been searched out with using a functional condition as a search condition and reflecting the functional condition in an initial value of the print setting item for the printing device if the judgment in the judging step is affirmative.
2. The method of the item 1, further including, before the judging step, steps of searching out a printing device based on an instruction of the user, displaying a list of printing devices which have been searched out in the searching step in a display section so as to allow the user to be able to select a printing device from the list, and accepting selection of the printing device made by the user from the list displayed in the displaying step.
3. The method of the item 2, further including a step of storing the functional condition in a search condition storage section, if the printing device is searched out with using the functional condition as the search condition in the searching step wherein the functional condition used as a reference during the search is acquired from the search condition storage section in the reflecting step.
4. The method of the item 1, wherein the functional condition includes at least one of a duplex printing function, a stapling function and a punching function.
5. The method of the item 1, wherein when the functional condition includes a plurality of functional conditions, a default value of each corresponding print setting item is changed so as to agree with each of the plurality of functional conditions, in the reflecting step.
6. The method of the item 1, further including a step of setting the initial value of the print setting item for the printing device in conformity to a succession rule determined in advance, when the printing device is judged in the judging step to have been searched out without using the functional condition as the search condition.
7. The method of the item 6, wherein the succession rule determined in advance is a rule in which a value which has been set in advance is taken over as the initial value of the print setting item under a predetermined condition when an object of the selection is changed to another printing device.

BRIEF DESCRIPTION OF THE DRAWINGS

FIG. 12 is a diagram that exemplifies a function owned by a printer for each model.

FIG. 13 is a diagram for illustrating setting of initial values of print setting items based on succession rule R1.

FIG. 16 is a diagram for illustrating setting of initial values of print setting items based on succession rule R4.

DETAILED DESCRIPTION OF THE PREFERRED EMBODIMENTS

Figure 1:
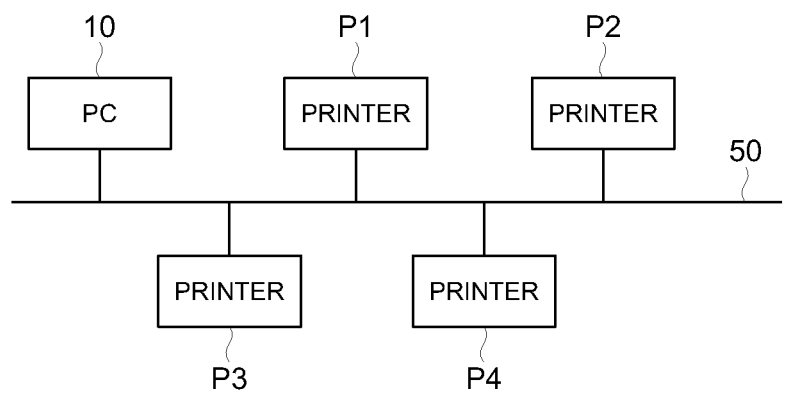
FIG. 1 is a block diagram showing the overall construction of a print system relating to an embodiment of the invention.

An embodiment of the invention will be described in detail as follows, referring to the drawings.

FIG. 1 is a block diagram showing the overall construction of a print system relating to an embodiment of the invention.

A print system shown in FIG. 1 is equipped with PC (personal computer) 10 that serves as a print setting device, and with printers (devices) P1-P4 serving as printing devices. Printers P1-P4 are connected with PC 10 to be capable of communicating mutually through network 50.

The network 50 is composed of various types of networks including, for example, LAN wherein computers or network apparatuses are connected with each other under a standard such as Ethernet (registered trademark) and token ring and FDDI, or WAN wherein LANs are connected by exclusive lines. Meanwhile, kinds and the number of apparatuses to be connected to the network 50 are not limited to the example shown in FIG. 1.

Figure 2:
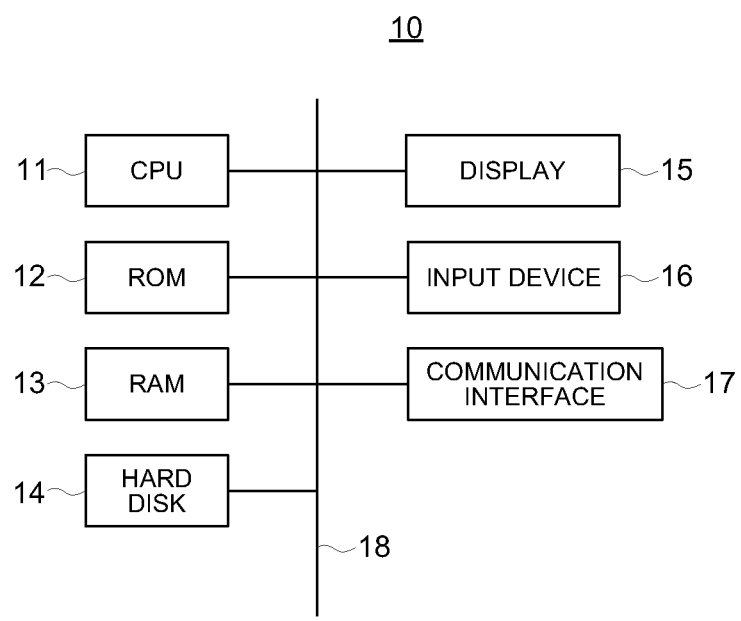
FIG. 2 is a block diagram showing the construction of a PC shown in FIG. 1.

FIG. 2 is a block diagram showing construction of PC 10 shown in FIG. 1. The PC 10 includes CPU 11, ROM 12, RAM 13, hard disk 14, display 15, input device 16 and communication interface 17, and these items are connected with each other through bus 18 for exchanging signals.

The CPU 11 operates the controls of the aforesaid respective items and carries out various sorts of arithmetic processing according to programs. The ROM 12 stores various types of programs and various types of data. The RAM 13 stores programs and data temporarily as a work area. The hard disk 14 stores various types of programs including an operating system (OS) and various types of data.

The display 15 is, for example, CRT or LCD which displays various types of information. The input device 16 includes a pointing device such as a mouse and includes a key board, and is used to carry out various types of input.

The communication interface 17 is an interface for communication with other apparatuses such as printers P1-P4, and there may be used serial interfaces such as USB (Universal Serial Bus) and IEEE1394, parallel interfaces such as SCSI and IEEE1284, various types of local connection interfaces like wireless communication interfaces such as Bluetooth (registered trademark), IEEE802.11, HomeRF and IrDA and telephone line interfaces for connecting to the telephone lines, in addition to network interfaces under standards of Ethernet (registered trademark), token ring and FDDI.

Document file creation application and printer driver 100 (see FIG. 3) are installed in the hard disk 14.

The printer driver 100 is installed in OS that is stored in PC 10 as a host computer, and it is a program that generates print jobs. In the present embodiment, it is possible for the printer driver 100 to select a printer of a destination for output from plural printers P1-P4 on network 50, based on operations of a user who uses printer search screen 200 (see FIG. 6 and others) that will be described later, in the case of printing.

Figure 3:
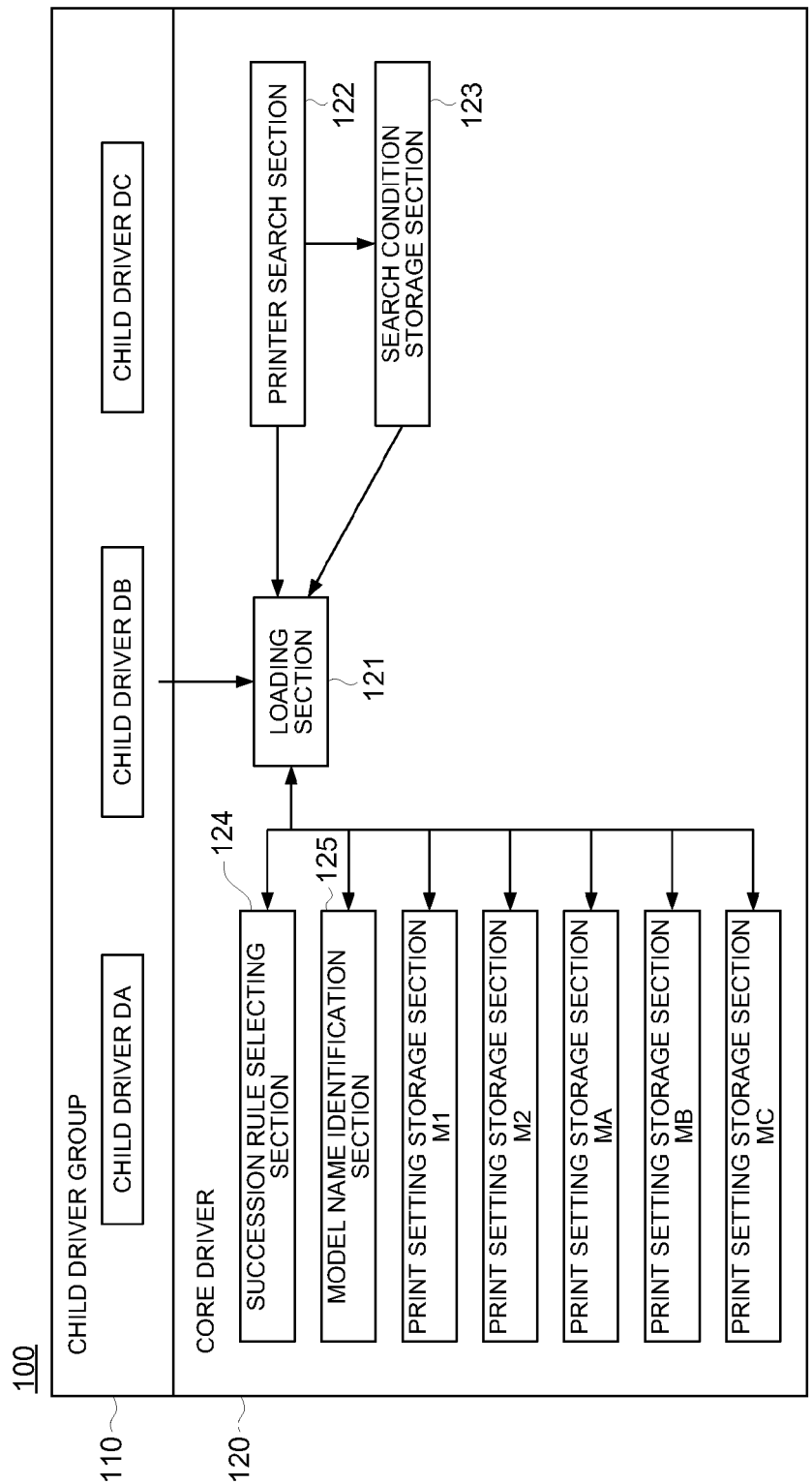
FIG. 3 is a functional block diagram of a printer driver.

FIG. 3 is a functional block diagram of printer driver 100.

The printer driver 100 of the present embodiment is composed roughly of two portions one of which is child driver group 110 and the other is core driver 120.

The child driver group 110 is composed of child drivers DA, DB and DC corresponding respectively to specific models A, B and C.

The core driver 120 has loading section 121, printer search section 122, search condition storage section 123, succession rule selecting section 124, model name identification section 125 and print setting storage sections M1, M2, MA, MB and MC, as components for realizing functions relating to the present embodiment.

The printer driver 100 is read out into RAM 13 from hard disk 14 in the case of start-up, and is executed by CPU 11. Due to this, the functions of the aforesaid components of the printer driver 100 are exhibited. Meanwhile, areas for search condition storage section 123 and for print setting storage sections M1, M2, MA, MB and Mc are secured in RAM 13.

The printer driver 100 is configured so that it can function as a printer driver for a specific model, when an appropriate child driver is read into the loading section 121 of the core driver 120.

The printer search section 122 is a module that searches out a printer on network 50. When the search is conducted after functional conditions of the printer are determined, the conditions are stored in the search condition storage section 123. Results of the search are delivered to the loading section 121, and a list of the printers searched out is displayed on display 15. A user can select any printer from the listed printers. When a printer is selected, an appropriate child driver corresponding to the selected printer is loaded on core driver 120 from child driver group 110. When search is conducted after determining functional conditions, the contents of the search condition storage section 123 are reflected in initial values of print setting items that specifies print conditions in the selected printer. In other words, the default value (fixed value) is changed. The contents of the search condition storage section 123 are renewed each time the printer has been searched out after determining functional conditions of the printer.

On the other hand, when the printer has been searched out without determining functional conditions, namely, when all neighboring devices on networks are searched, initial values of the print setting items are set based on a succession rule selected in succession rule selecting section 124. A function for realizing succession of print setting values that are values of print setting items are as follows. That is, model name identification section 125 identifies a model name of the printer. The print setting storage section M1 stores print setting values of the printer which have just been selected right before (device immediately before only). The print setting storage section M2 accumulates print setting values of the printers which have been selected in the past and stores them (accumulation of devices in the past). The print setting storage sections MA, MB and MC store print setting values of the selected printers respectively for model A, model B and model C (exclusive use for model A, exclusive use for model B and exclusive use for model C).

Meanwhile, although the number of child drivers is three in FIG. 3 as a matter of convenience for description, the number is not limited to three, and optional number of child drivers can be mounted. In this case, print setting storage sections (exclusive use for model X) which agree in terms of the number to child drivers are prepared.

Incidentally, PC 10 may either include components other than the aforesaid components, or PC 10 may not include a part of the aforesaid components.

Printers P1-P4 receive print jobs generated by printer driver 100 of PC 10 through network 50, and conduct print processing based on the print jobs. Further, the printers P1-P4 correspond to SNMP/MIS. The printers P1-P4 send various responses, based on inquiries or requests from constituent equipment on network 50 such as PC 10. Therefore, PC 10 can acquire information concerning functions of the printers P1-P4.

Figure 4:
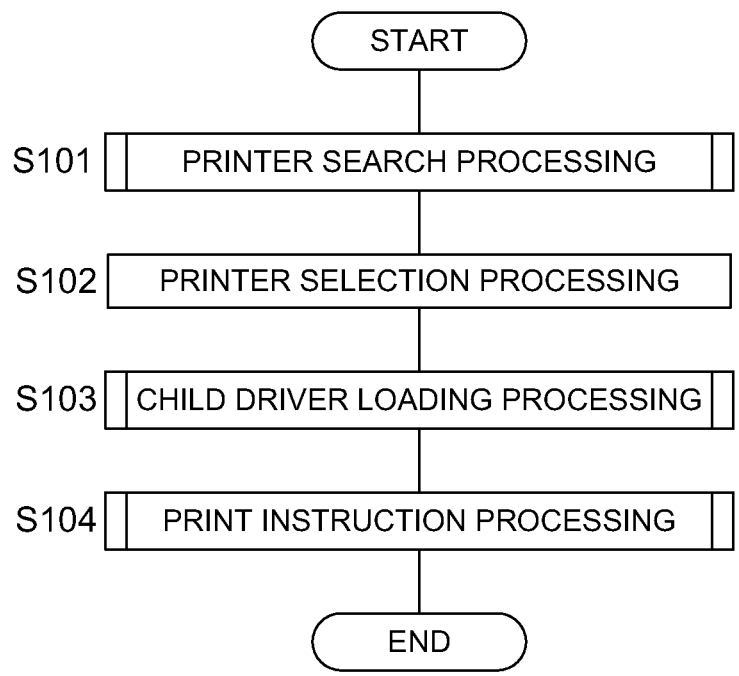
FIG. 4 is a flow chart showing procedures of processing by a printer driver in a PC.

Next, processing by a printer driver in PC 10 will be described as follows, referring to FIG. 4. Incidentally, an algorithm shown on a flow chart in FIG. 4 is stored in hard disk 14 of PC 10 as a program, and it is read out into RAM 13 to be implemented by CPU 11 of PC 10.

First, a printer is searched for (S101). Details of this searching processing for the printer will be described later.

Then, the desired printer is selected by a user from a list of printers searched out in step S101 (S102). In other words, a list of the printers searched out in step S101 is displayed on display 15 so that the user can select, and the selection of a printer by the user from the displayed list is accepted.

Then, a child driver corresponding to the selected printer is loaded on core driver 120 (S103). Details of this loading processing for the child driver will be described later.

Then, values of the print setting items are set based on operations of a user through a print setting screen displayed by a printer driver, and print instruction processing is carried out (S104). Details of this print instruction processing will be described later.

Next, printer search processing (S101) will be described as follows, referring to FIG. 5.

After the printer search processing is started, a printer search screen is displayed on display 15 first.

Figure 6:
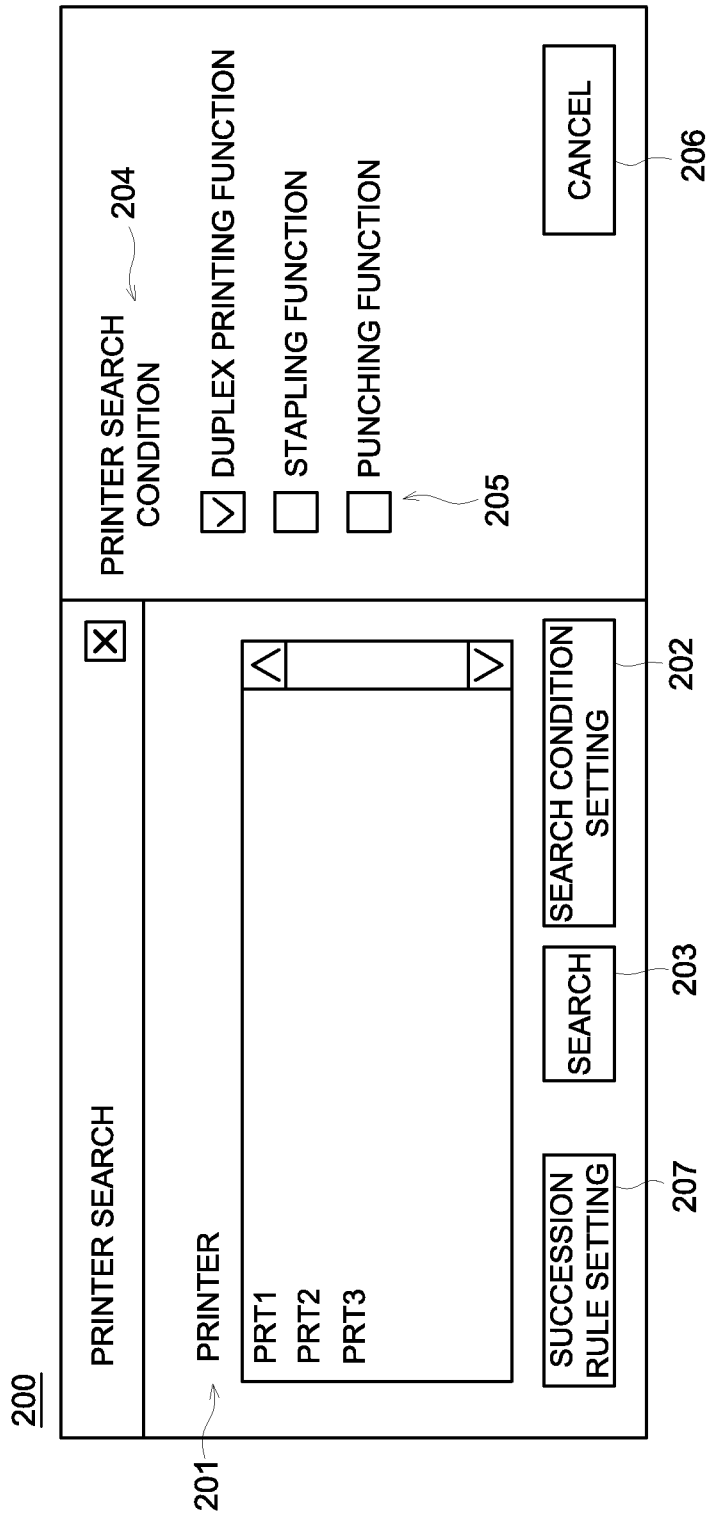
FIG. 6 is a diagram showing an example of a printer search screen.

FIG. 6 is a diagram showing an example of a printer search screen.

As is shown in FIG. 6, printer search screen 200 has list display area 201 on which a list of printers searched out is displayed. Further, the printer search screen 200 has thereon search condition setting button 202 for determining functional conditions when searching for a printer, search button 203 for conducting search for printers and succession rule setting button 207 for determining a succession rule.

When the search condition setting button 202 is depressed down, printer search condition setting section 204 appears on the side of the printer search screen 200. However, the printer search condition setting section 204 may also be included in the printer search screen 200 from the beginning. The printer search condition setting section 204 includes check box 205 for accepting an instruction by the user for functional conditions and cancel button 206 for canceling the instruction of the functional conditions. When the cancel button 206 is pressed down, a display of the printer search condition setting section 204 disappears. In the present embodiment, it is possible to designate functional conditions so that at least one of "capability of duplex printing", "capability of stapling" and "capability of punching" may be included. The "capability of duplex printing" shows that a printer has a duplex printing function, the "capability of stapling" shows that a printer has a stapling function and the "capability of punching" shows that a printer has a punching function. Since printers equipped with these functions are limited in terms of the number, these functions are preferable to be included in functional conditions that can be designated by a user. However, it can be also be configured that other functional conditions such as "capability of folding" can be determined as a functional condition.

Figure 7:
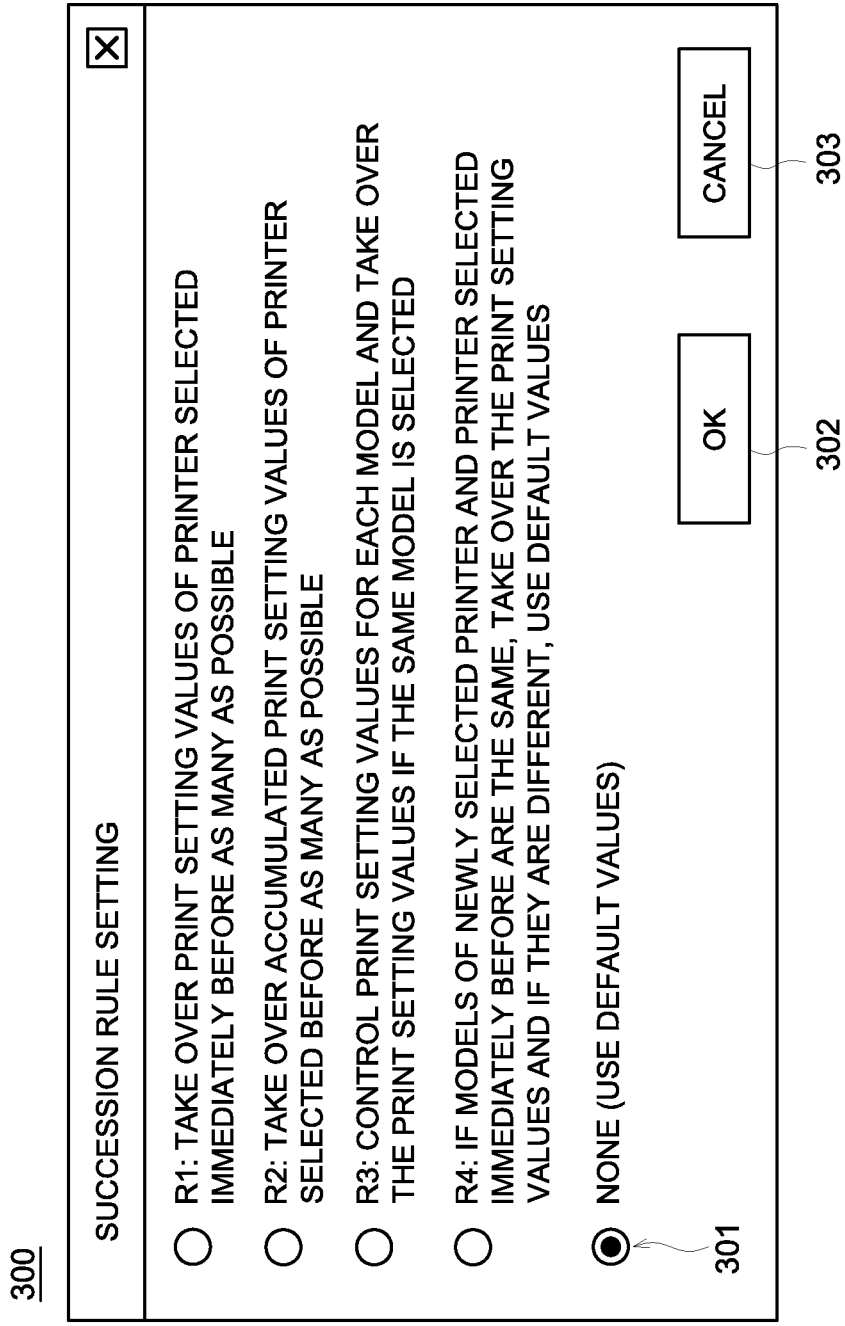
FIG. 7 is a diagram showing an example of a succession rule setting screen.

When succession rule setting button 207 is pressed down, a succession rule setting screen appears. FIG. 7 is a diagram showing an example of a succession rule setting screen.

Succession rule setting screen 300 has radio button 301 for accepting an alternative selection by a user for a succession rule. The succession rule is referred when initial values of print setting items are set on the occasion where the printer has been searched out without determining functional conditions. This succession rule is a rule in which the values which have been set before is taken over, as initial values of print setting items in the printer that has been changed to, under the prescribed condition, when the object of the selection has been changed to another printer.

As shown in FIG. 7, there are succession rules including succession rule R1 to take over print setting values of the printer selected immediately before as far as possible, succession rule R2 to take over accumulated print setting values of the printer selected in the past as far as possible, succession rule R3 to manage print setting values for each model and to take over the print setting values if the same model is selected and succession rule R4 wherein, if a newly selected printer and a printer selected immediately before are the same in terms of a model, the print setting values are taken over, and if they are different in terms of a model, default values (fixed values) are used. Usually, a radio button representing "No succession rule" is turned on, and default values (fixed values) are used as print setting values. When OK button 302 is pressed down, a succession rule shown by radio button 301 is set, and a display of succession rule setting screen 300 disappears. Cancel button 303 is a button for canceling setting of a succession rule.

Figure 5:
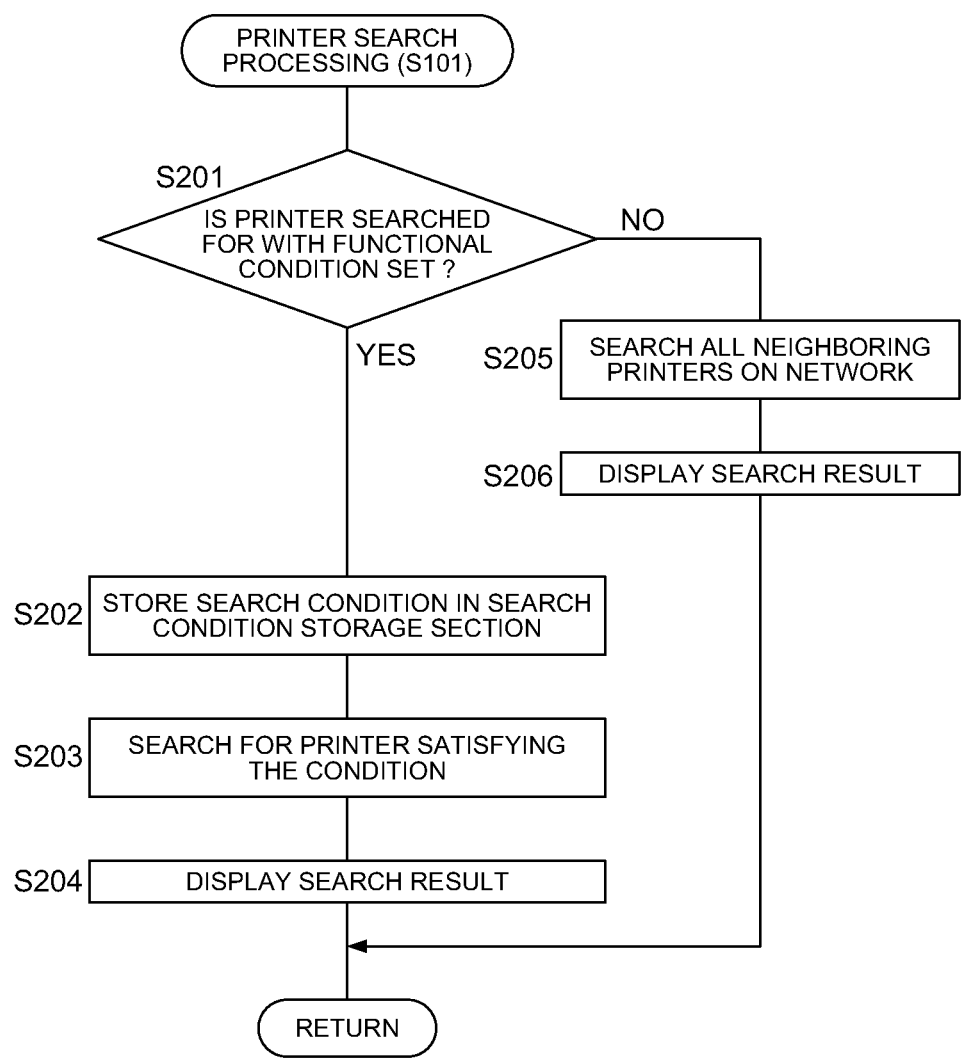
FIG. 5 is a flow chart showing procedures of printer search processing.

In turning back to the description of FIG. 5, it is judged whether the printer has been searched out after determining functional conditions or not in step S201. To be concrete, it is judged whether the search button 203 has been pressed down after one or more of check boxes 205 for designating functional conditions have been marked with checks, on printer search condition setting section 204 or not.

When the printer is judged to be searched out after determining functional conditions (S201: YES), the functional conditions are stored in search condition storage section 123 (S202).

Figure 8:
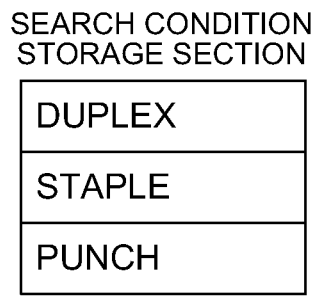
FIG. 8 is a diagram showing an example of storing data in a search condition storage section.

FIG. 8 is a diagram showing an example of storing data in search condition storage section 123. In the example in FIG. 8, there are determined "capability of duplex printing", "capability of stapling" and "capability of punching" as functional conditions.

Next, a printer that agrees with designated functional conditions is searched for on network 50 (S203), and results of the search, namely, the list of the printers searched out is displayed on list display area 201 of printer search screen 200 (S204).

On the other hand, when a printer is judged to be searched out without determining functional conditions (S201: NO), all neighboring printers on network 50 are searched (S205), and a result of the search, namely, a list of the printers searched out is displayed on list display area 201 of printer search screen 200 (S206). The neighboring printers are those in the same sub-network, for example, and they are searched by using IP address. However, when printers are managed by a floor map, for example, printers in the same floor may also be searched as neighboring printers.

When processing operations in FIG. 5 are terminated, the process returns to the flow chart in FIG. 4, and printer selection processing (S102) is carried out. That is, the selection of a printer by a user from the list displayed on the list display area 201 is accepted. Since the result of the search is displayed in a form of a list, a user can select easily while observing the list. In this case, a selection of the printer is accepted when a user double-clicks a name of the printer displayed on the list display area 201.

Figure 9:
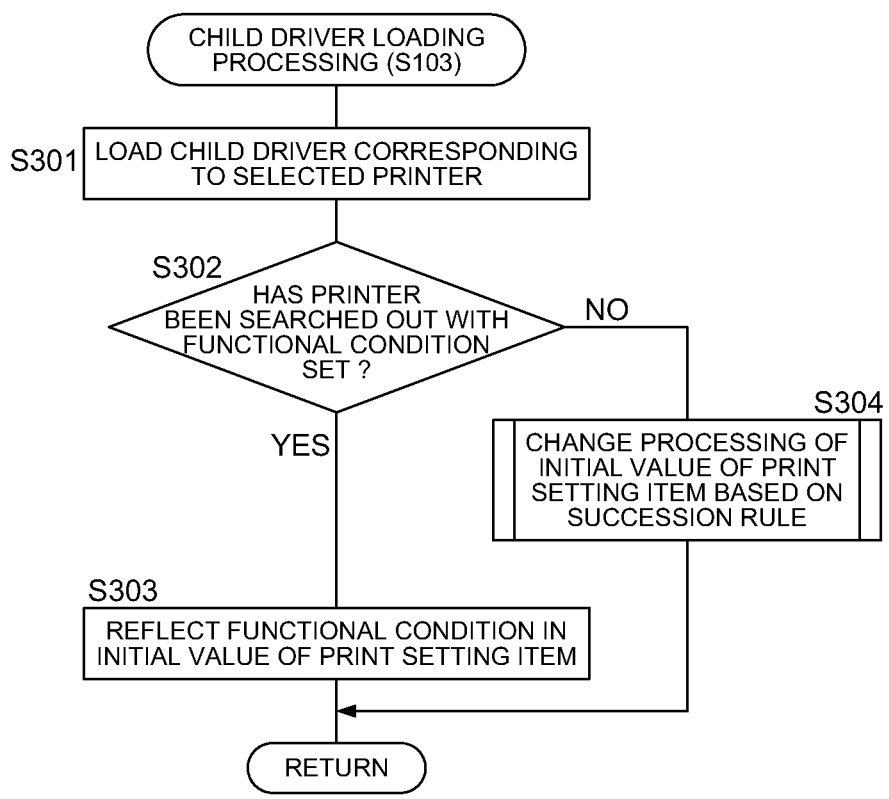
FIG. 9 is a flow chart showing procedures of child driver loading processing.

Next, child driver loading processing (S103) will be described as follows, referring to FIG. 9.

First, an appropriate child driver corresponding to the selected printer is selected from child driver group 110, and is loaded on loading section 121 of core driver 120 (S301). Owing to this, printer driver 100 functions as a printer driver for the specific model. Information about functions relating to the selected printers can be acquired through network 50.

In step S302, judgment is made whether the printer has been searched out after determining functional conditions in step S101 or not.

When the printer is judged to have been searched out after determining functional conditions (S302: YES), the functional conditions used as reference during the search are reflected in the initial values of the print setting items for the selected printer (S303). To be concrete, the functional conditions used as reference during the search are acquired from search condition storage section 123, and are reflected in the initial values of the print setting items corresponding to the acquired conditions.

When processing operations in step S303 are terminated, the process returns to the flow chart in FIG. 4, and a print setting screen corresponding to the selected printer is displayed on display 15, in the beginning of print instruction processing (S104).

Figure 10:
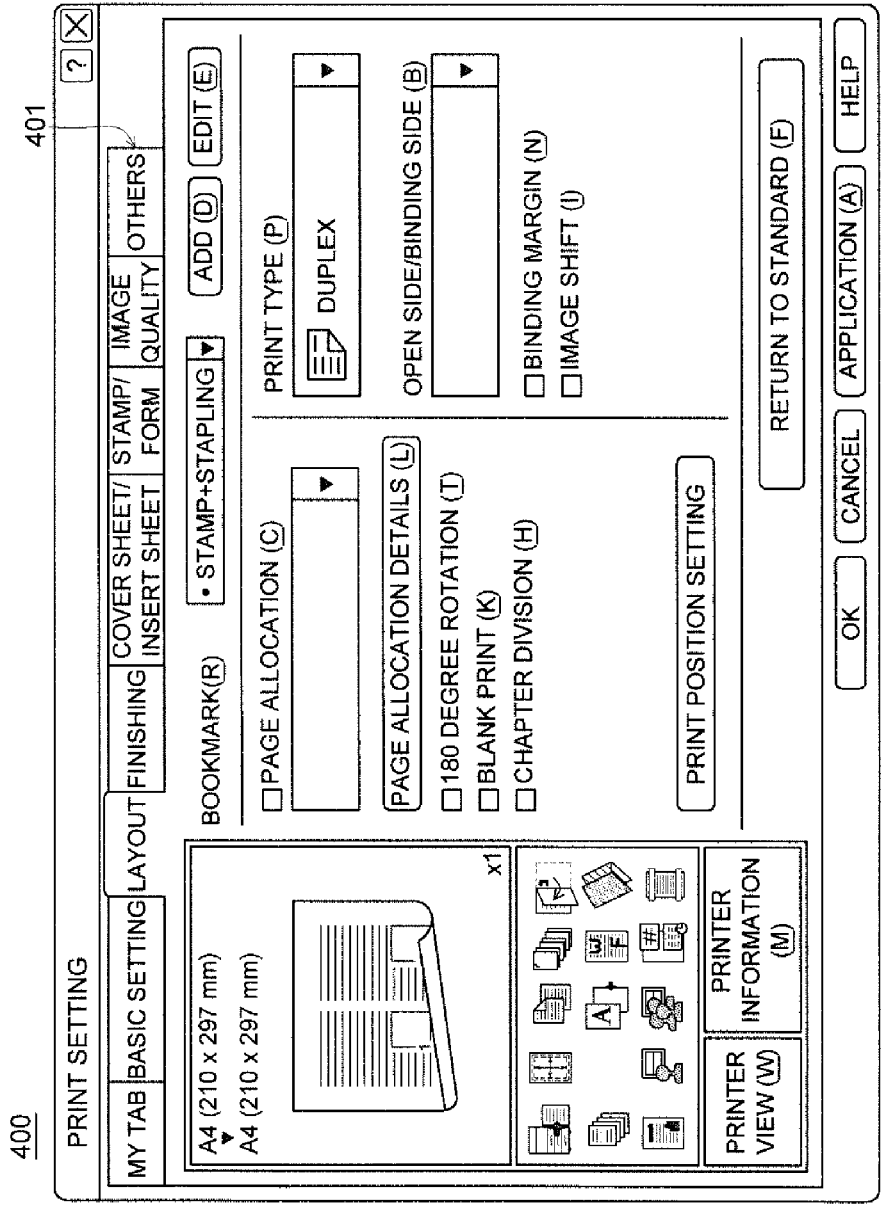
FIG. 10 is a diagram showing an example of a print setting screen.

FIG. 10 is a diagram showing an example of a print setting screen.

Print setting screen 400 has a plurality of tabs 401, and plural print setting items are classified for each function to be correlated. The tab makes it possible to use plural screens by changing over them in one window, in a window of GUI screen. Tabs in the print setting screen 400 include, for example, "My tab", "basic setting", "layout", "finishing", "cover sheet/inserted sheet", "stamp/form", "image quality" and "others". In the example shown in FIG. 10, the tab "layout" is selected, and "capability of duplex printing" representing a functional condition which has been used as reference during the search is reflected in the initial values of "print type" which is the corresponding print setting items. That is, "one side" which is a default value is changed to "duplex".

On the other hand, when the printer is judged to have been searched out without determining functional conditions (S302: NO), initial values of the print setting items concerning the selected printer are set in accordance with the succession rule determined in advance (S304). Details of the change processing of the initial values of the print setting items based on the succession rule will be described later.

Figure 11:
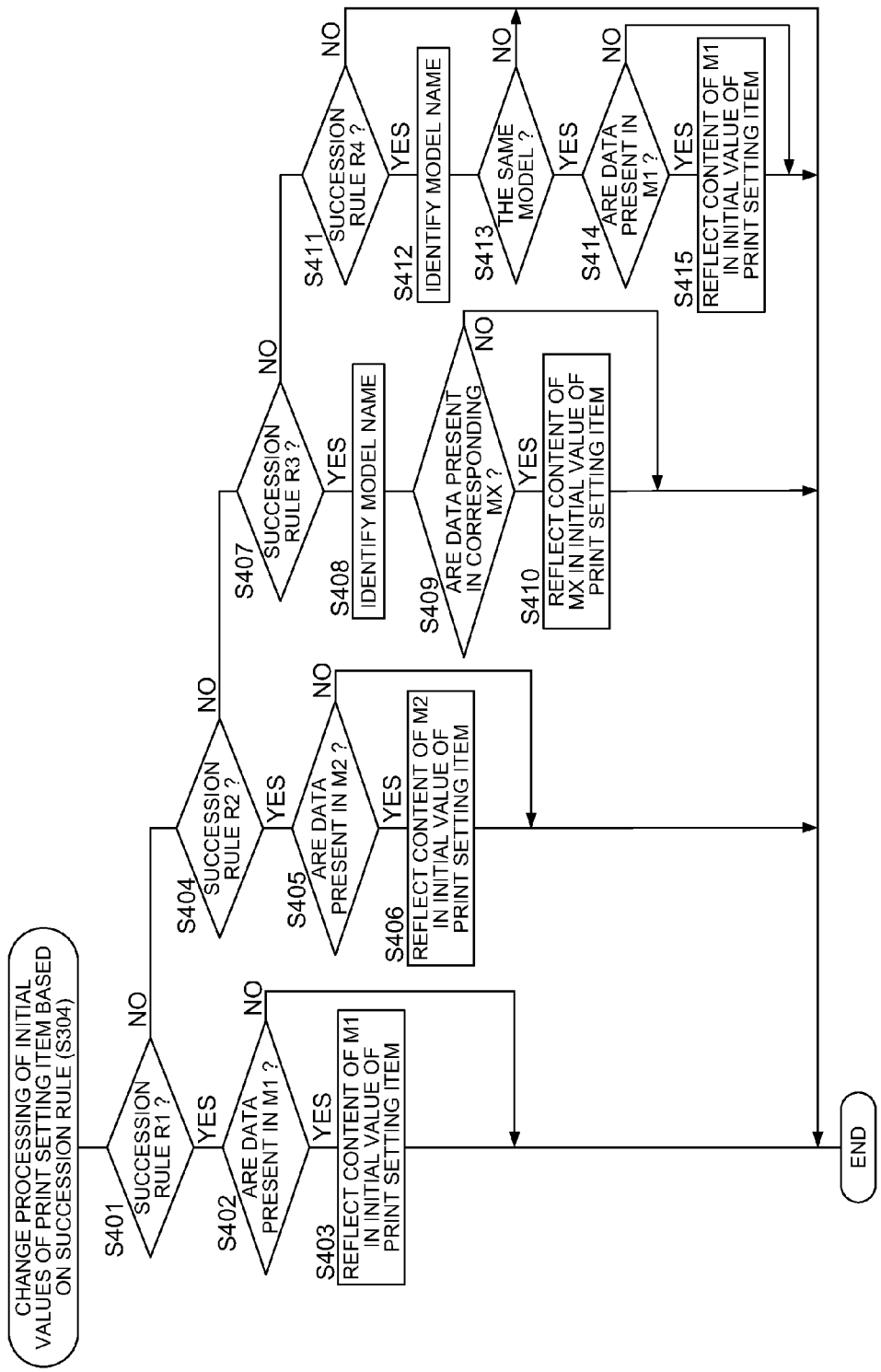
FIG. 11 is a flow chart showing procedures of change processing of initial values of print setting items based on a succession rule.

Next, the change processing of the initial values of the print setting items based on the succession rule (S304) will be described as follows, referring to FIG. 11.

First, it is judged whether succession rule R1 is set or not (S401).

When the succession rule R1 is judged to be set (S401: YES), a judgment is made whether data are present in print setting storage section M1 or not (S402). In other words, a judgment is made whether print setting values of the printer having been selected immediately before are stored in the print setting storage section M1 or not.

When the data are judged to be present in the print setting storage section M1 (S402: YES), the contents stored in the print setting storage section M1 are reflected in the initial values of the print setting items in the selected printer, and processing in FIG. 11 is terminated (S403). On the other hand, when the data are judged to be absent in the print setting storage section M1 (S402: NO), the processing in FIG. 11 is terminated as it is.

When the succession rule R1 is judged not to be set in step S401 (S401: NO), a judgment is made whether succession rule R2 is set or not (S404).

When the succession rule R2 is judged to be set (S404: YES), a judgment is made whether data are present in print setting storage section M2 or not (S405). In other words, a judgment is made whether accumulated print setting values of the printers selected in the past are stored in the print setting storage section M2 or not.

When the data are judged to be present in the print setting storage section M2 (S405: YES), the contents stored in the print setting storage section M2 are reflected in the initial values of the print setting items in the selected printer, and processing in FIG. 11 is terminated (S406). On the other hand, when the data are judged to be absent in the print setting storage section M2 (S405: NO), the processing in FIG. 11 is terminated as it is.

When the succession rule R2 is judged not to be set in step S404 (S404: NO), a judgment is made whether succession rule R3 is set or not (S407).

When the succession rule R3 is judged to be set (S407: YES), the model name of the selected printer is identified (S408).

Successively, a judgment is made whether data are present in print setting storage section MX or not (S409). In other words, a judgment is made whether print setting values exclusive for the model of the selected printer are stored in the print setting storage section MX or not. The print setting storage section MX means a print setting storage section corresponding to the model, and it is print setting storage section MA, print setting storage section MB or print setting storage section MC in this case.

When the data are judged to be present in the print setting storage section MX (S409: YES), the contents stored in the print setting storage section MX are reflected in the initial values of the print setting items in the selected printer, and processing in FIG. 11 is terminated (S410). On the other hand, when the data are judged to be absent in the print setting storage section MX (9409: NO), the processing in FIG. 11 is terminated as it is.

When the succession rule R3 is judged not to be set in step S407 (S407: NO), a judgment is made whether succession rule R4 is set or not (S411).

When the succession rule R4 is judged to be set (S411: YES), the model name of the selected printer is identified (S412).

Successively, it is judged whether the printer selected newly is the same as the printer selected immediately before in terms of the model or not (S413). When the printer selected newly is judged not to be of the same model (S413: NO), the processing in FIG. 11 is terminated as it is.

When the printer selected newly is judged to be of the same model (S413: YES), a judgment is made whether data are present in print setting storage section M1 or not (S414). In other words, it is judged whether print setting values of the printer selected immediately before are stored in print setting storage section M1 or not.

When the data are judged to be present in the print setting storage section M1 (S414: YES), the contents stored in the print setting storage section M1 are reflected in the initial values of the print setting items in the selected printer, and processing in FIG. 11 is terminated (S415). On the other hand, when the data are judged to be absent in the print setting storage section M1 (S414: NO), the processing in FIG. 11 is terminated as it is.

When the succession rule R4 is judged not to be set in step S411 (S411: NO), the processing in FIG. 11 is terminated as it is. This case is an occasion where a judgment is made to be "No succession rule".

Next, processing for changing initial values of print setting items based on a succession rule will be described as follows, referring to the specific example.

FIG. 12 is a diagram that exemplifies a function owned by a printer for each model. In FIG. 12, the model A is equipped with a duplex printing function, a stapling function and a punching function, while, the model B is equipped with a duplex printing function and a stapling function, but is not equipped with a punching function, and the model C is equipped with neither stapling function nor punching function, although it is equipped with a duplex printing function. In the description hereafter, the occasion where each model of the printer is equipped with functions shown in FIG. 12 will be described.

Incidentally, any of default values (fixed values) of print setting items corresponding respectively to a duplex printing function, a stapling function and a punching function is made to be "OFF".

FIG. 13 is a diagram for illustrating setting of initial values of print setting items based on succession rule R1.

In the case of (1), print setting values in printer P1 are reflected in initial values of print setting items in printer P2, because of the change over to the same model.

In the case of (2), it is a change-over to the different model and print setting values other than "punching" among print setting values in printer P1 are reflected in initial values of print setting items in printer P2.

In the case of (3), it is a change-over to the different model and the print setting value of "duplex printing" in printer P1 is reflected in an initial value of a print setting item in printer P2.

Figure 14:
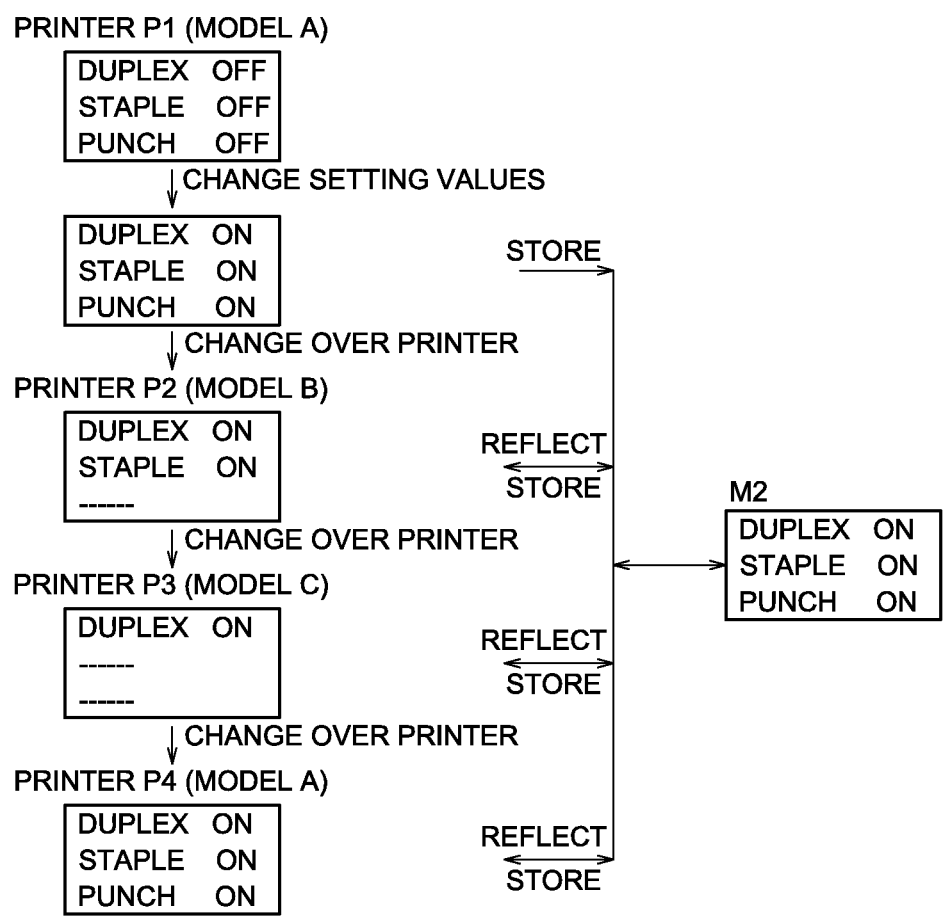
FIG. 14 is a diagram for illustrating setting of initial values of print setting items based on succession rule R2.

FIG. 14 is a diagram for illustrating setting of initial values of print setting items based on succession rule R2.

As shown in FIG. 14, print setting values in printer P1 are stored in print setting storage section M2 first.

When changing over to printer P2 has been conducted, print setting values of "duplex printing" and "stapling" of print setting storage section M2 are reflected in initial values of print setting items. In this example, the contents set in printer P2 are stored in print setting storage section M2, although the print setting values are not changed on printer P2. In this case, the contents of print setting storage section M2 are not changed for "punching" that is not present in printer P2.

When changing over to printer P3 has been conducted, print setting value of "duplex printing" of print setting storage section M2 is reflected in initial value of a print setting item. In this example, the content set in printer P3 is stored in print setting storage section M2, although the print setting values are not changed on printer P3. In this case, contents of print setting storage section M2 are not changed for "stapling" and "punching" which are not present in printer P3.

When changing over to printer P4 has been conducted, print setting values of "duplex printing", "stapling" and "punching" of print setting storage section M2 are reflected in initial values of print setting items. Though the printer P3 selected immediately before has neither function of "stapling" nor function of "punching", the contents which have been set on printer P1 before are taken over to printer P4, because print setting values are stored in print setting storage section M2 accumulatively. Though the print setting values are not changed on printer P4 in the present example, the contents which have been set on the printer P4 are stored in print setting storage section M2.

Figure 15:
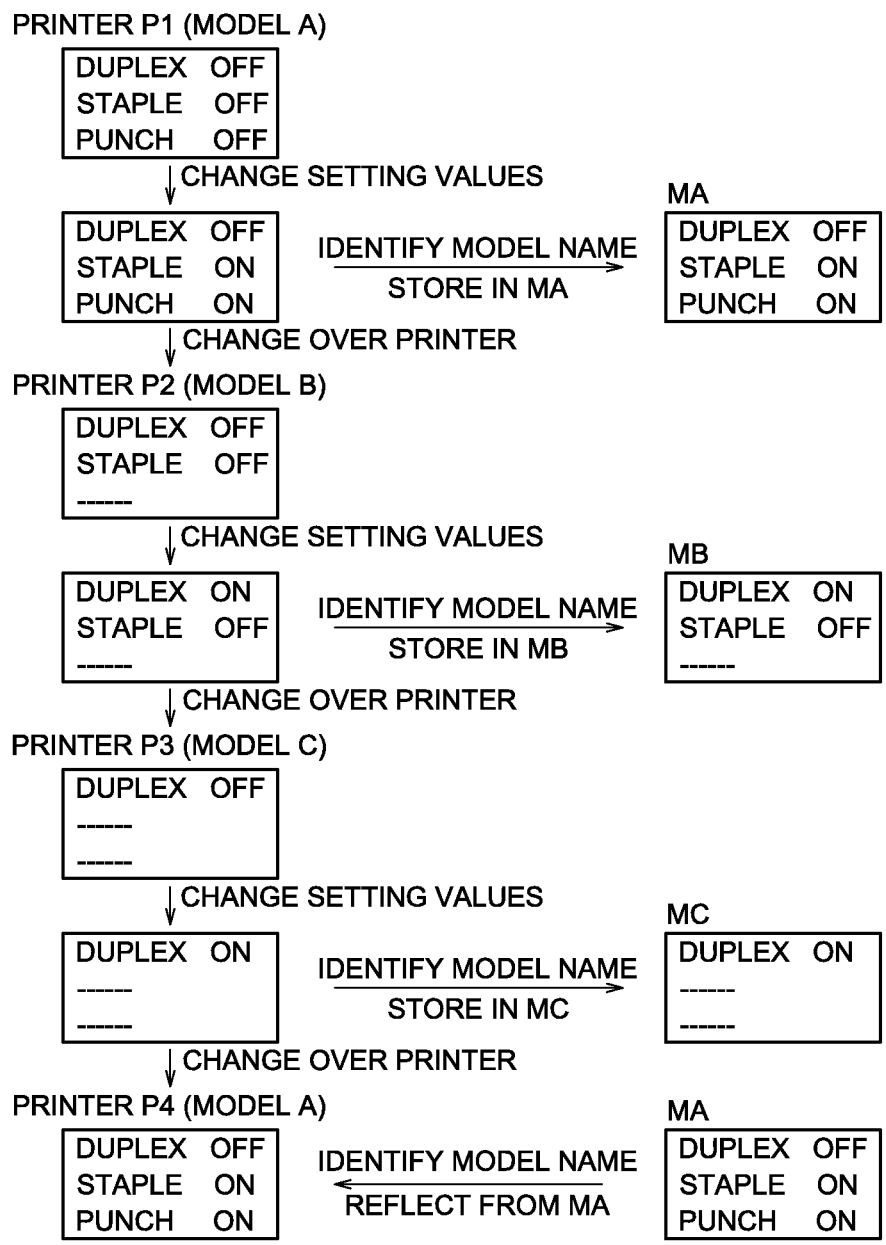
FIG. 15 is a diagram for illustrating setting of initial values of print setting items based on succession rule R3.

FIG. 15 is a diagram for illustrating setting of initial values of print setting items based on succession rule R3.

As shown in FIG. 15, first, a print setting values of printer P1 are stored in print setting storage section MA, after the model is identified as model A by model name identification section 125.

When changing over to printer P2 has been conducted, the model is identified as model B by the model name identification section 125, and print setting values in printer P2 are stored in print setting storage section MB.

When changing over to printer P3 has been conducted, the model is identified as model C by the model name identification section 125, and a print setting value in printer P3 is stored in print setting storage section MC.

When changing over to printer P4 has been conducted, the model is identified as model A by the model name identification section 125, and print setting values for "duplex printing", "stapling" and "punching" in the print setting storage section MA are reflected in initial values of print setting items. A value of print setting item "duplex printing" in printer P3 that is selected immediately before is "ON", but this print setting value does not influence, and contents set for model A before are taken over.

FIG. 1G is a diagram for illustrating setting of initial values of print setting items based on succession rule R4.

In the case of (1), print setting values in printer P1 are reflected in initial values of print setting items in printer P2, because of the change over to the same model.

In the case of (2), default values (fixed values) are used as initial values of print setting items in printer P2 because of the change over to the different model.

Figure 17:
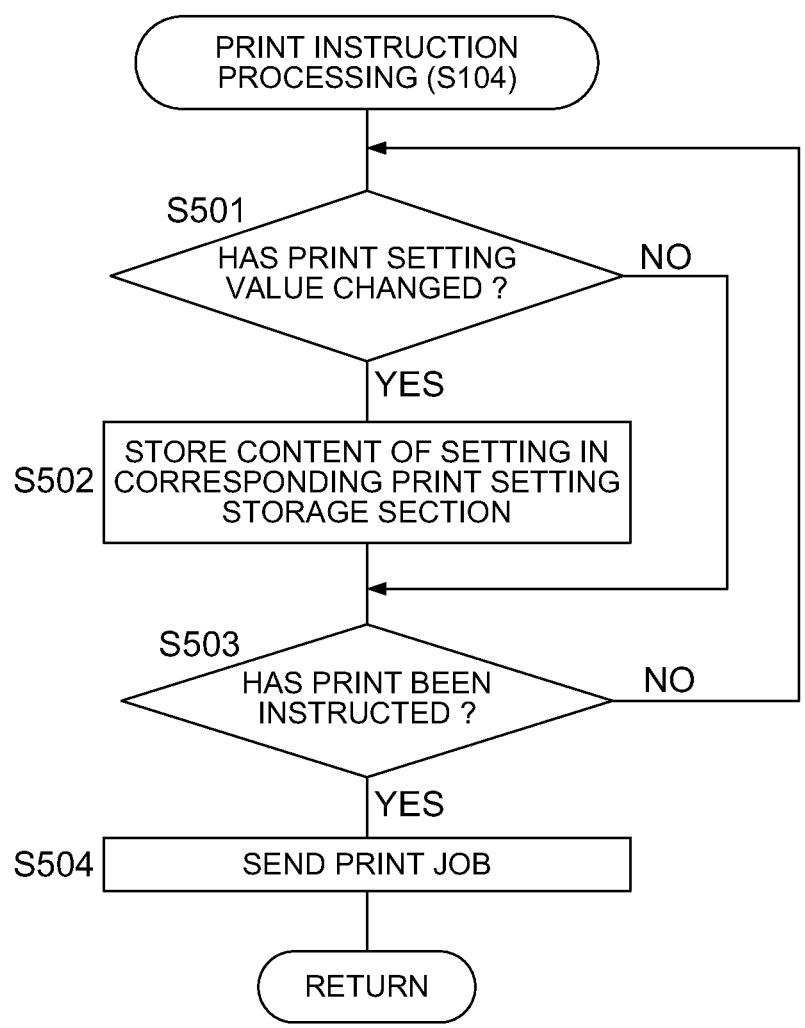
FIG. 17 is a flow chart showing procedures of print instruction processing.

Next, print instruction processing (S104) will be described as follows, referring to FIG. 17.

First, a print setting screen (see FIG. 10) corresponding to the selected printer is displayed on display 15, and it is judged whether a print setting values have been changed or not (S501).

When the print setting values have been changed (S501: YES), print setting values in the selected printer are stored (S502) in print setting storage section M1 (only device immediately before), print setting storage section M2 (accumulation of devices in the past) and in print setting storage section MX (model X exclusive). This processing is necessary for controlling initial values of print setting items based on succession rules.

In step S503, a judgment is made whether print instructions have been given or not. In other words, it is judged whether a print button that is not illustrated has been pressed down or not by a user.

When the print instruction is judged not to have been given yet (S503: NO), the process returns to step S501. When the print instruction is judged to have been given (S503: YES), PC10 sends print jobs including print setting values generated by printer driver 100 to the selected printer through network 50 (S504). Then, the printer carries out printing based on the received print job.

In the present embodiment, when the printer selected by a user is judged to be a printer searched out after determining functional conditions, PC10 reflects the functional conditions which have been used for reference during the search in the initial values of the print setting items for that printer, as stated above.

Therefore, a user does not need to conduct troublesome operations for changing, from a default value to a desired value, for the print setting item corresponding to the functional conditions used as reference during the search. In this way, a user can carry out desired printing without going through unnecessary procedures. In this case, when a number of functional conditions used as reference during the search is plural, default values of respective print setting items which correspond to these plural conditions are changed to agree respectively with the conditions, thus, it is possible to save more time and efforts for operations.

Further, in the present embodiment, when the printer selected by a user is judged to be a printer searched out without determining functional conditions, PC10 sets the initial values of the print setting items for that printer, in accordance with the succession rule established in advance.

Therefore, when the selection of the printer is changed, default values of the print setting items are changed based on the succession rule established in advance, thus, a user can continue operations for printing more smoothly, which is an advantage.

The invention is not limited only to the aforesaid embodiments, and it can be modified variously within a range of the claims.

For example, in the embodiment mentioned above, though the program for realizing functions to select a desired printer from plural printers on the network, is configured to be a printer driver, the invention is not limited to this, and the invention can also be provided as an application program that is different from the printer driver.

Further, though a printer is used as a printing device in the aforesaid embodiment, various types of printing devices including a copying machine and MFP (Multi-Function Peripheral) can be used.

Though a PC is used in the aforesaid embodiment as a print setting device, print setting devices in various types such as a workstation, a server computer and a mobile terminal can be used.

A measure and a method for conducting various types of processes in the print setting device relating to the present embodiment can be realized by any one of a hardware circuit for exclusive use and a programmed computer. The aforesaid program may either be offered through a computer-readable recording medium such as a flexible disk or CD-ROM, or be offered on an on-line basis through a network such as the Internet. In this case, a program recorded on the computer-readable recording medium is usually transmitted to a storage section such as a hard disk to be stored therein. Further, the aforesaid program may either be offered as a single application software, or be installed in a software of this device as one function of the print setting device.

In the invention, as described above, when the printing device selected by a user is judged to be one searched out after determining functional conditions, the functional conditions which have been used as reference during the search are reflected in the initial value of the print setting item for the printing device, and a default value (fixed value) is changed.

Therefore, the user does not need to conduct troublesome operations for changing the default value to a desired value for the print setting item corresponding to the functional conditions used as reference during the search. In this way, a user can carry out desired printing without going through unnecessary procedures.

What is claimed is:

1. A method to be implemented by a print setting device for setting a print setting item which specifies a print condition in a printing device selected by a user from a plurality of printing devices, the method comprising the steps of:

judging whether or not the printing device selected by the user is one of printers that have been searched out with using a functional condition as a search condition;

reflecting the functional condition in an initial value of the print setting item for the printing device if the judgment in the judging step is affirmative; and setting the initial value of the print setting item for the printing device in conformity to a succession rule determined in advance, when the printing device is judged in the judging step to have been searched out without using the functional condition as the search condition, wherein the succession rule determined in advance is a rule in which a value which has been set in advance is taken over as the initial value of the print setting item under a predetermined condition when an object of the selection is changed to another printing device.

2. The method of claim 1, wherein the search condition that does not include the functional condition is a condition for searching out another printing device neighboring the print setting device on the network, and the search condition that includes the functional condition includes at least one of a duplex printing function, a stapling function, and a punching function.

3. The method of claim 1, further comprising, before the judging step:

searching out a printing device based on an instruction of the user;

displaying a list of printing devices which have been searched out in the searching step in a display section so as to allow the user to be able to select a printing device from the list; and accepting selection of the printing device made by the user from the list displayed in the displaying step.

4. The method of claim 3, further comprising:

storing the functional condition in a search condition storage section, if the printing device is searched out with using the functional condition as the search condition in the searching step, wherein the functional condition used as a reference during the search is acquired from the search condition storage section in the reflecting step.

5. The method of claim 1, wherein the functional condition includes at least one of a duplex printing function, a stapling function, and a punching function.

6. The method of claim 1, wherein when the functional condition includes a plurality of functional conditions, a default value of each corresponding print setting item is changed so as to agree with each of the plurality of functional conditions, in the reflecting step.

7. A non-transitory computer-readable recording medium which stores a program for setting a print setting item which specifies a print condition in a printing device selected by a user from a plurality of printing devices, the program making a computer execute steps comprising:

judging whether or not the printing device selected by the user is one of printers that have been searched out with using a functional condition as a search condition;

reflecting the functional condition in an initial value of the print setting item for the printing device if the judgment in the judging step is affirmative; and setting the initial value of the print setting item for the printing device in conformity to a succession rule determined in advance, when the printing device is judged in the judging step to have been searched out without using the functional condition as the search condition, wherein the succession rule determined in advance is a rule in which a value which has been set in advance is taken over as the initial value of the print setting item under a predetermined condition when an object of the selection is changed to another printing device.

8. The non-transitory computer-readable recording medium of claim 7, wherein the search condition that does not include the functional condition is a condition for searching out another printing device neighboring the print setting device on the network, and the search condition that includes the functional condition includes at least one of a duplex printing function, a stapling function, and a punching function.

9. The non-transitory computer-readable recording medium of claim 7, wherein the program further makes a computer execute steps comprising, before the judging step:
   searching out a printing device based on an instruction of the user;
   displaying a list of printing devices which have been searched out in the searching step in a display section so as to allow the user to be able to select a printing device from the list; and
   accepting selection of the printing device made by the user from the list displayed in the displaying step.

10. The non-transitory computer-readable recording medium of claim 9, wherein the program further makes a computer execute a step of:
    storing the functional condition in a search condition storage section, if the printing device is searched out with using the functional condition as the search condition in the searching step,
    wherein the functional condition used as a reference during the search is acquired from the search condition storage section in the reflecting step.

11. The non-transitory computer-readable recording medium of claim 7, wherein the functional condition includes at least one of capability of duplex printing, capability of stapling, and capability of punching.

12. The non-transitory computer-readable recording medium of claim 7, wherein, when the functional condition includes a plurality of functional conditions, a default value of each corresponding print setting item is changed so as to agree with each of the plurality of functional conditions, in the reflecting step.

13. A print setting device for setting a print setting item which specifies a print condition in a printing device selected by a user from a plurality of printing devices, the print setting device comprising:
    an input section for accepting input of information from the user including a search condition designated by the user; and
    a control section for judging whether the search condition includes a functional condition or not,
    wherein the control section reflects the functional condition as an initial value of the print setting item for the selected printing device if the judgment is affirmative,
    wherein the control section sets the initial value of the print setting item for the printing device in conformity to a succession rule determined in advance, when the control section judges that the search condition does not include the functional condition, and
    wherein the succession rule determined in advance comprises a rule in which a value which has been set in advance is taken over as the initial value of the print setting item under a predetermined condition when an object of the selection is changed to another printing device.

14. The print setting device of claim 13, wherein the search condition that does not include the functional condition is a condition for searching out another printing device neighboring the print setting device on the network, and the search condition that includes the functional condition includes at least one of a duplex printing function, a stapling function, and a punching function.

15. The print setting device of claim 13, further comprising:
    a display section for displaying various information;
    wherein the control section searches out for at least one of the plurality of printing devices on a network based on the search condition designated by the user and accepted by the input section, and allows the display section to display the at least one of printing devices searched out, and
    wherein the input section accepts selection of a printing device made by the user from the at least one of the plurality of printing devices displayed on the display section.

16. The print setting device of claim 15, further comprising:
    a storage section for storing the functional condition;
    wherein if the judgment is affirmative, the control section allows the storage section to store the functional condition, and
    wherein the control section allows the display section to display automatically a print setting screen that reflects the functional condition stored in the storage section as the initial value of the print setting item for the selected printing device whose selection has been accepted if the judgment is affirmative.

17. The print setting device of claim 13, wherein the functional condition includes at least one of a duplex printing function, a stapling function and a punching function.

18. The print setting device of claim 13, wherein when the functional condition includes a plurality of functional conditions, the control section changes a default value of each corresponding print setting item so as to make the default value agree with each of the plurality of functional conditions.

* * * * *